United States Patent [19]
Koch et al.

[11] Patent Number: 5,343,146
[45] Date of Patent: Aug. 30, 1994

[54] COMBINATION COATING THICKNESS GAUGE USING A MAGNETIC FLUX DENSITY SENSOR AND AN EDDY CURRENT SEARCH COIL

[75] Inventors: Frank J. Koch; Leon C. Vandervalk; David J. Beamish, all of Ogdensburg, N.Y.

[73] Assignee: De Felsko Corporation, Ogdensburg, N.Y.

[21] Appl. No.: 956,280

[22] Filed: Oct. 5, 1992

[51] Int. Cl.$^5$ .............. G01B 7/10; G01R 33/12; G01N 27/72
[52] U.S. Cl. .................... 324/230; 324/227; 324/232
[58] Field of Search ............... 324/228–232, 324/207.11, 207.26, 207.22, 260–262, 227, 225

[56] References Cited

U.S. PATENT DOCUMENTS

| | | | |
|---|---|---|---|
| 3,716,779 | 2/1973 | Akulov | 324/34 TK |
| 3,740,998 | 6/1973 | Akulov | 73/1 A |
| 3,986,105 | 10/1976 | Nix et al. | 324/34 TK |
| 4,005,359 | 1/1977 | Smoot | 324/34 TK |
| 4,255,709 | 3/1981 | Zatsepin et al. | 324/229 |
| 4,425,546 | 1/1984 | Taylor | 324/230 |
| 4,433,290 | 2/1984 | Koch | 324/230 |
| 4,567,436 | 1/1986 | Koch | 324/230 |
| 4,599,562 | 7/1986 | Koch | 324/230 |
| 4,722,142 | 2/1988 | Schmidt | 33/169 F |
| 4,733,178 | 3/1988 | Koch | 324/230 |
| 4,752,739 | 6/1988 | Wang | 324/230 |
| 4,829,251 | 5/1989 | Fischer | 324/230 |
| 5,006,799 | 4/1991 | Pfanstiehl | 324/230 |
| 5,015,950 | 5/1991 | Rose et al. | 324/224 |
| 5,094,009 | 3/1992 | Koch et al. | 33/834 |
| 5,191,286 | 3/1993 | Fischer | 324/232 |

FOREIGN PATENT DOCUMENTS

| | | |
|---|---|---|
| 0028487A1 | 5/1981 | European Pat. Off. |
| 1463363 | 2/1977 | United Kingdom |
| 2156526A | 10/1985 | United Kingdom |

Primary Examiner—Gerard R. Strecker
Assistant Examiner—Warren S. Edmonds
Attorney, Agent, or Firm—Burns, Doane, Swecker & Mathis

[57] ABSTRACT

A gauge probe for a handheld combination coating thickness gauge allows the combination coating thickness gauge to measure both nonferrous coatings on ferrous substrate and nonconductive coatings on conductive nonferrous substrate. The gauge probe enables the combination coating thickness gauge to determine automatically, with a single probe, the substrate characteristics, and to effect a measurement of the coating thickness on that substrate. The technique used to measure coatings on a ferrous substrate utilizes a permanent magnet to provide a constant magnetic flux and a Hall sensor and thermistor arranged to measure the temperature-compensated magnetic flux density at one of the poles of the permanent magnet. The flux density at the magnet pole can be related to a nonferrous coating thickness on a ferrous substrate. The technique used to measure nonconductive coatings on a conductive nonferrous substrate utilizes eddy current effects. A coil near the gauge probe tip is excited by an alternating current oscillating between about 6 MHz and about 12 MHz. The coil sets up eddy currents on the surface of the conducting substrate. The resulting eddy currents set up an opposing magnetic field which in turn have an effect on the excited coil. The eddy current effects on the coil are quantified, and the degree of the eddy current effects on the coil are related to the nonconductive coating thickness on a conductive substrate. The gauge probe detects the substrate type and automatically determines the coating thickness on the detected substrate.

20 Claims, 5 Drawing Sheets

COMBINATION COATING THICKNESS GAUGE USING A MAGNETIC FLUX DENSITY SENSOR AND AN EDDY CURRENT SEARCH COIL

BACKGROUND OF THE INVENTION

1. Field of the Invention

The present invention relates to a gauge for determining coating thicknesses on substrates, and, in particular, to a gauge for a combination coating thickness gauge for determining the thickness of a nonferrous coating on a ferrous substrate, and the thickness of a nonconductive coating on a conductive nonferrous substrate.

2. Background Art

In the past, operators of coating thickness gauges were require to know the substrate type before measuring the coating thickness on that substrate. Based on that knowledge, the operator would then choose an appropriate probe configuration and make the appropriate measurement. Typically, an operator would require two independent gauging systems, or two independent probes that could be connect to a single gauge. In addition, the operator would have to determine the characteristics of the specimen (coating and substrate combination) prior to measuring the coating thickness on the determine substrate.

Here is a need for instrument that is able to determine automatically substrate characteristics and measure the coating thickness on that substrate. Such an instrument would enable an operator to place the single gauge probe tip of the instrument on the specimen and, with appropriate instrumentation connected to the gauge probe, to determine the substrate the and automatically measure the coating thickness.

Several dual purpose electromagnetic thickness gauges are known:

For example, U.S. Pat. No.3,986,105 to Nix et al. discloses a probe that uses two coils wound around an elongated ferromagnetic core. One coil is used to carry an excitation current and the other coil is used to make measurements. By altering the frequency of excitation, it is possible to observe the effects of both ferrous and nonferrous conductive substrates on the measurement coil. Low frequency (below 300 Hz) excitation currents allow for the measurement of the thickness of a nonferrous layer on a ferrous substrate, while high frequency (above 1000 Hz) excitation currents allow for the measurement of the thickness of a nonconductive layer on a nonferrous conductive substrate using eddy current effects on the measuring coil. The Nix et at. dual purpose electromagnetic thickness gauge does not utilize a constant magnetic field supplied by a permanent magnet in conjunction with a Hall effect magnetic sensor to measure a coating thickness, nor any means to compensate the measured magnetic flux density for changes in temperature, nor an eddy current search coil excited at a frequency sufficiently high to reduce the depth of penetration of eddy currents into the conductive substrate and thus does not provide a measurement that is sufficiently immune to substrate thickness variations. Furthermore, the Nix et at. dual purpose electromagnetic thickness gauge uses manual, not automatic, switching of thickness gauge modes (low or high frequency of coil excitation) depending on the magnetic character of the substrate.

U.S. Pat. No. 4,005,359 to Smoot discloses an electronic thickness gauge for measuring the coating thickness over ferrous and over conductive nonferrous substrates by measuring the movement of a low-frequency hump in the response curve for an over-coupled, double-tuned, open-faced transformer when ferrous and/or conductive nonferrous substrates are placed across the gap between the transformer pole-faces. Both the coating thickness and magnetic character of the substrate can be determined in one operation without ambiguity, and without any change in the instrument, due to the ability of the device to vary its overall frequency response in accordance with changes in its self-inductance and mutual-inductance. Because the Smoot coating thickness gauge requires the use of an open-faced transformer to measure a coating thickness over ferrous and over conductive nonferrous substrates, and requires the coated substrates to be placed across the relatively large gap between the transformer pole faces, the Smoot device necessarily makes contact with the coated substrate in at least two places, and the area of contact between the Smoot device and the coated surface is therefore relatively large. Since the Smoot coating thickness gauge does not use a Hall generator or an eddy current search coil to conduct either of the coating thickness measurements, the Smoot device cannot be compactly fit into a single gauge probe that contacts the coated surface in at most one place with a much smaller area of contact. There is thus a need for a compact coating thickness gauge probe that tests for a ferrous substrate, using a Hall generator, and tests for a nonferrous substrate, using an eddy current search coil, switching automatically from one to the other in order to measure a coating thickness over ferrous and over conductive nonferrous substrates, the gauge probe contacting the surface of the coated substrate in at most one place with a relatively small area of contact.

U.S. Pat. No. 4,255,709 to Zatsepin et at. discloses a device for measuring the thickness of coatings which, depending on a specific application, employs a different type of thickness gauge, such as electromagnetic, microwave, and ultrasonic, for example. The device measures the thickness of dielectric coatings applied onto metal articles and nonmagnetic electrodeposits on ferromagnetic articles. With an appropriately selected thickness gauge, the device measures the thickness of nonmagnetic, current-carrying coatings on nonmagnetic, current-carrying materials. The Zatsepin et at. coating thickness gauge system employs an automatic measurement range switching unit, but the automatic measurement range switching is used to automatically switch from one thickness measurement range to another without regard to the magnetic character of the underlying substrate. The Zatsepin et at. coating thickness gauge system uses manual, not automatic, switching of thickness gauges depending on the magnetic character of the substrate. There is thus a need for a single gauge probe for a combination coating thickness gauge that enables automatic switching of coating thickness gauging modes depending on an automatic determination of the nature of the underlying substrate.

U.S. Pat. No. 4,722,142 to Schmidt discloses an apparatus for measuring the thickness of a coating that is not highly conductive, such as plastic, on the inside wall of a metallic tubular member, and throughout the length of the metallic tubular member. Preferably, the apparatus uses an electronic eddy current loss proximity detector to measure the coating thickness.

U.S. Pat. No. 5,015,950 to Rose et at. discloses a system for nondestructive analysis of barrier coatings on electrically conductive materials by imposing a controlled known heat load to a localized area of the coating and measuring the changes in the electrical conductivity of the underlying material using an eddy current coil. The electrical conductivity of the material is affected by changes in the temperature related to thermal conduction into the material through the coating, allowing the thickness of the coating, its thermal resistance, and/or its structural integrity to be analyzed, for any type of coating.

Both the Schmidt and Rose et al. coating thickness gauge systems use eddy current detectors to measure coating thicknesses over conductive substrates, but neither the Schmidt nor the Rose et al. coating thickness gauge system uses a Hall generator to measure coating thicknesses over ferrous substrates, and hence neither the Schmidt nor the Rose et al. coating thickness gauge system uses automatic or manual switching of detectors depending on the magnetic character of the substrate.

Accordingly, there is a need for a gauge probe for a combination coating thickness gauge for measuring both nonferrous coatings on ferrous substrates, using a Hall generator, and nonconductive coatings on conductive nonferrous substrates, using an eddy current search coil, that enables automatic switching of coating thickness gauging modes depending on an automatic determination of the nature of the underlying substrate. The gauge probe should contact the surface of the coated substrate in at most one place with a relatively small area of contact.

SUMMARY OF THE DISCLOSURE

A handheld combination coating thickness gauge is able to measure both a nonferrous coating on a ferrous substrate and a nonconductive coating on a conductive nonferrous substrate. The gauge probe enables the combination coating thickness gauge to determine automatically, with a single probe, the substrate characteristics, and to effect a measurement of the coating thickness on that substrate. The gauge probe integrates the sensors required to effect both types of measurement in one probe.

The technique used to measure coatings on a ferrous substrate utilizes a permanent magnet to provide a constant magnetic flux and a Hall sensor and thermistor arranged to measure the temperature-compensated magnetic flux density at one of the poles of the permanent magnet. The flux density at the magnet pole corresponds to a nonferrous coating thickness on a ferrous substrate.

The technique used to measure nonconductive coatings on a conductive nonferrous substrate utilizes eddy current effects. A coil near the gauge probe tip is excited by an alternating current oscillating between about 6 MHz and about 12 MHz. The coil sets up eddy currents on the surface of the conducting substrate. The resulting eddy currents set up an opposing magnetic field which in turn has an effect on the excited coil. The eddy current effects on the coil are quantified by measuring the impedance of the coil, and the degree of the eddy current effects on the coil are related to the nonconductive coating thickness on a conductive substrate. The coil impedance corresponds to a nonconductive coating thickness on a conductive substrate.

The gauge probe detects the substrate type, automatically switches to the appropriate measuring mode, and automatically determines the coating thickness on the detected substrate.

The gauge probe of the present invention is advantageously used in a coating thickness gauge that tests for a ferrous substrate, measuring the temperature-compensated magnetic flux density at a pole of a permanent magnet using a Hall generator and a thermistor. The magnetic flux density and temperature measurements are converted into a temperature-compensated magnetic flux density value that is proportional to the coating thickness on the ferrous substrate. If no ferrous substrate is detected, the coating thickness gauge automatically switches over to test for a conductive nonferrous substrate, measuring the effects of eddy currents generated in the conductive nonferrous substrate by the coating thickness gauge magnetic fields using an eddy current search coil. The eddy current measurements are converted into an eddy current frequency value that is proportional to the coating thickness on the conductive nonferrous substrate.

BRIEF DESCRIPTION OF THE DRAWINGS

The foregoing and other features of the present invention will become apparent to one of ordinary skill in the art to which the invention pertains from the following detailed description when read in conjunction with the drawings, in which:

FIG. 1 (a) is a cross section of a probe of the present invention taken along line IA—IA in FIG. 1(b);

DETAILED DESCRIPTION OF THE PREFERRED EMBODIMENTS

Figure 1A:
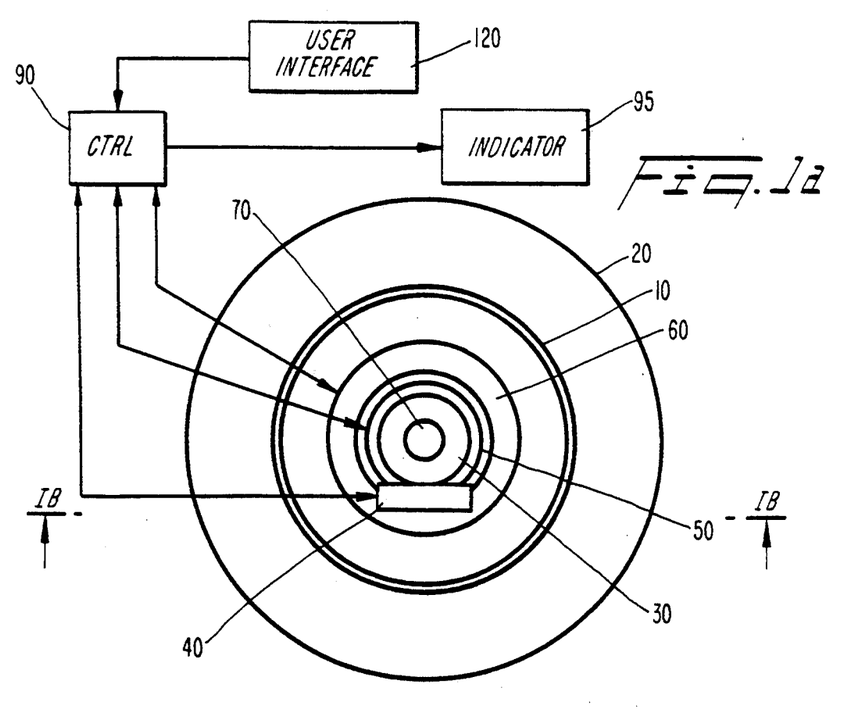
Figure 1B:
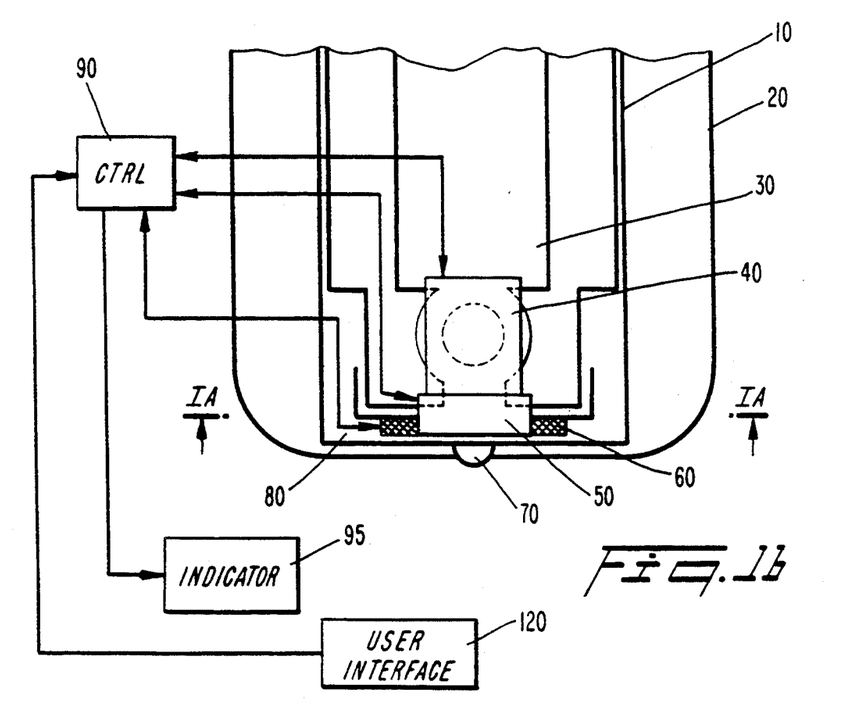
Fig. 1(b) is a cross section of a probe of the present invention taken along line IB—IB in FIG. 1 (a)

FIGS. 1 (a) and (b) show in cross section an embodiment of a gauge probe in accordance with the present invention. The cross sections are taken along line IA—IA in FIG. 1(b), and along line IB—IB in FIG. 1(a), respectively. A cylindrical probe shell 20 surrounds a cylindrical probe core 10. Probe core 10 comprises an annular eddy current search coil 60 compactly encompassing a cylindrical Hall effect magnetic sensor 50. The eddy current search coil 60 is embedded in thermally conductive epoxy 80, attaching the eddy current search coil 60 to the probe core 10, and allowing heat generated when the eddy current search coil 60 is excited to dissipate. When excited by an alternating current with a sufficiently high frequency (greater than about 1000 Hz), the eddy current search coil 60 generates eddy currents from the surface of an underlying conductive substrate down to about the penetration depth of the substrate. The penetration depth of the substrate depends on the frequency of the alternating current exciting the eddy current search coil 60, and varies from one substrate to another. In the gauge probe according to the present invention, the eddy current search coil 60 can be excited by an alternating current of sufficiently high frequency to reduce the depth of penetration of eddy currents into the conductive substrate so as to provide an eddy current effect measurement that is substantially immune to substrate thickness variations.

The Hall effect magnetic sensor 50 is disposed at one end of a cylindrical permanent magnet 30 in order to measure the magnetic flux density in the neighborhood of the pole face of magnet 30 nearest to the Hall effect magnetic sensor 50. The Hall effect is used to measure the magnetic field $B_i$ passing through the Hall effect magnetic sensor 50. The magnetic field $B_i$ is related to the magnetic flux density $\phi$ passing through a surface according to $$\phi = \int \sum_i B_i dA_i$$

where the integration extends over the relevant surface with differential surface element $dA_i$.

Figure 2:
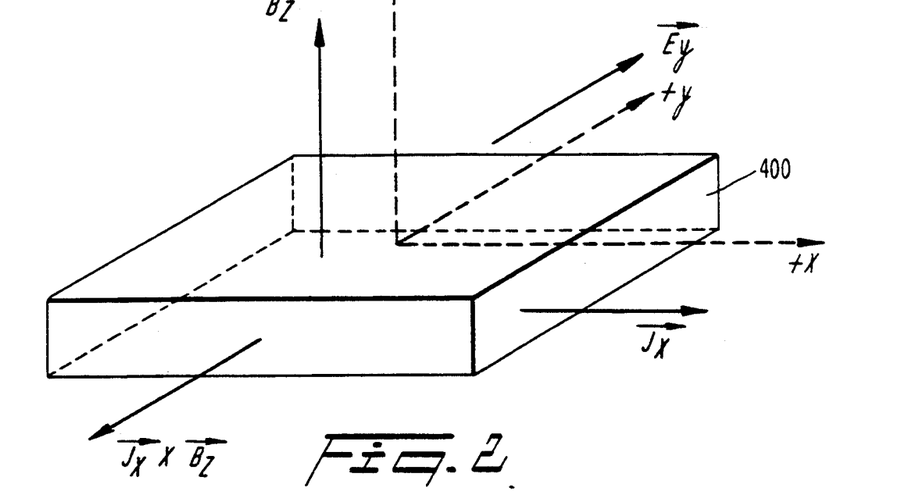
FIG. 2 is a representation of an arrangement of currents and fields useful for illustrating the Hall effect.

FIG. 2 is a representation of an arrangement of currents and fields useful for illustrating the Hall effect. FIG. 2 shows a slab 400 of a conductor or a semiconductor with a thickness t in the z direction, a width w in the y direction, carrying a current density $J_x$, in the x direction, sitting in a magnetic field $B_z$ in the z direction. The current density $J_x$ is composed of a density n of charge carriers, each charge carrier carrying a charge q, travelling with a drift velocity $v_x$ in the x direction. The Lorentz force $F_i^{Lorentz}$ is given by $$F_i^{Lorentz} = qE_i + q\epsilon_{ijk}v_j B_k$$

where $E_i$ is any electric field to which the charge carders are subjected, and $e_{ijk}$ is the completely antisymmetric tensor in three spatial dimensions. At first, $E_i$ is zero, and the Lorentz force $F_i^{Lorentz} = F_y^{Lorentz} = -qv_x B_z = -(J_x/n)B_z$ is in the negative y direction, causing the charge carriers to be deflected in the negative y direction. As the charge carriers pile up on the face of slab 400 normal to the negative y direction, an electric field $E_i = E_y = v_x B_z = (J_x/(nq))B_z$ is established in the positive y direction neutralizing the overall net Lorentz force $F_i^{Lorentz}$, leading to equilibrium, where the forces are exactly balanced.

The compensating electric field $E_y$ gives rise to a Hall voltage $V_{Hall} = wE_y$ across slab 400, a manifestation of the Hall effect, that can be measured with sufficient accuracy. The Hall current $I_{Hall}$ flowing through slab 400 is simply related to the current density $J_x$, since $I_{Hall} = wtJ_x$, and, like the Hall voltage $V_{Hall}$, the Hall current $I_{Hall}$. It can also be measured with sufficient accuracy. The Hall resistance $R_{Hall}$, defined by $$R_{Hall} = \frac{V_{Hall}}{I_{Hall}} = \frac{w\left(\frac{J_x}{nq}\right)B_z}{wtJ_x} = \left(\frac{1}{nq}\right)\frac{B_z}{t} = R\frac{B_z}{t}$$

where $V_{Hall} = wE_y = w(J_x/(nq))B_z$ and $I_{Hall} = wtJ_x$ have been used, is related to the Hall coefficient $R = (1/(nq))$ as shown. The Hall coefficient R has been experimentally determined for many conducting and semiconducting materials. Therefore, knowing the Hall coefficient R for the material of slab 400, and knowing the thickness t of slab 400, by measuring the Hall voltage $V_{Hall}$ and the Hall current $I_{Hall}$ with sufficient accuracy, the magnitude of the magnetic field $B_z$ passing through slab 400 can be determined.

The Hall coefficient $R = (1/(nq))$ for a given material depends on the density n of charge carriers in the material. The density n of charge carriers in the material in turn depends on the temperature of the material, $n = n(T)$ where T is the absolute temperature of the material. Therefore, as is well known, the measurement of magnetic fields using the Hall effect can be very sensitive to the temperature of a Hall effect magnetic sensor.

A thermistor 40 is disposed on the Hall effect magnetic sensor 50 and contacts the permanent magnet 30. Thermistor 40 measures the temperature of the Hall effect magnetic sensor 50, and outputs the temperature measurement to controller 90.

A probe tip 70 connected to probe core 10 protrudes through the bottom of the probe shell 20. Probe tip 70 serves as a spacer between probe core 10 and a surface of a coated substrate, keeping a known distance d between the coating surface and probe core 10, assuming that the axis of cylindrical symmetry of probe core 10 is kept substantially perpendicular to the planar surface of the coated substrate. The axis of cylindrical symmetry of probe core 10 is kept substantially perpendicular to the planar surface of the coated substrate preferably because such a configuration ensures greater uniformity in the measurement of the magnetic flux density $\phi$ in Hall effect magnetic sensor 50. Because of probe tip 70, there will also be a known distance between Hall effect magnetic sensor 50 and the coating surface, and there will be another known distance between the pole face of permanent magnet 30 nearest Hall effect magnetic sensor 50 and the coating surface.

To effect a coating thickness indication, an operator places the probe tip 70 on the coating to be measured so that the axis of cylindrical symmetry of probe core 10 is substantially perpendicular to the surface of the coated substrate. Controller 90 effects measurement of the magnetic flux density $\phi$ at Hall effect magnetic sensor 50. Controller 90 also effects measurement of the temperature T of Hall effect magnetic sensor 50. The pole face of the permanent magnet 30 closest to the coating surface is oriented to be substantially parallel to the coating surface, and thus substantially parallel to the underlying substrate, further ensuring greater uniformity in the magnetic flux density $\phi$ measurement. The magnetic flux density $\phi$ measurement is effected using Hall effect magnetic sensor 50 attached to the pole face of permanent magnet 30, and the temperature measurement is effected using thermistor 40 attached to both Hall effect magnetic sensor 50, and permanent magnet 30.

Hall effect magnetic sensor 50 is connected to controller 90 to indicate conventionally the magnetic flux density $\phi$ in the neighborhood of the pole face of permanent magnet 30. Similarly, the thermistor 40 is connected to controller 90 to indicate conventionally the temperature T of Hall effect magnetic sensor 50. Controller 90 conventionally converts the indicated magnetic flux density $\phi$ and temperature T into a quantity that is proportional to the temperature-compensated magnetic flux density $\phi^{tempcomp}$ in the neighborhood of the pole face of permanent magnet 30.

Figure 3A:
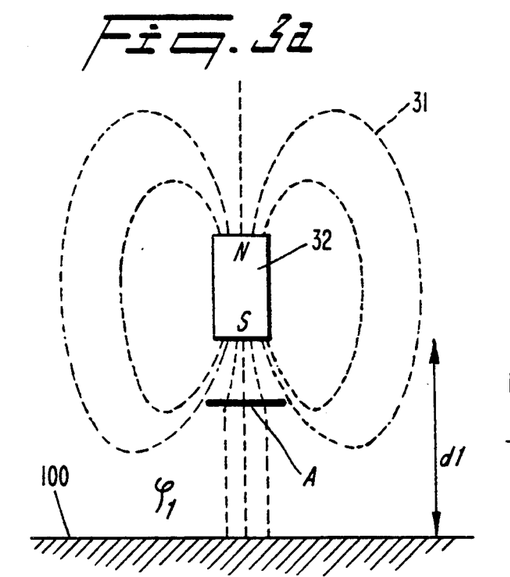
FIG. 3(a) is a diagrammatic representation of magnetic field lines of a permanent magnet that is a distance $d_1$ above a ferrous substrate.
Figure 3B:
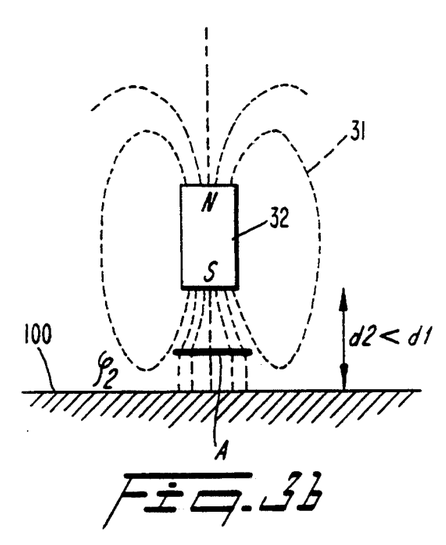
FIG. 3(b) is a diagrammatic representation of magnetic field lines of a permanent magnet that is a distance $d_2$ above a ferrous substrate, where $d_2 < d_1$ in FIG. 3(a)

FIGS. 3(a) and (b) diagrammatically illustrate the magnetic field lines 31 and the effect on magnetic flux density $\phi$ at the pole face of permanent magnet 32 as the magnet 32 is brought near a ferrous substrate 100 whose surface 102 is substantially parallel to the pole face of the magnet 32. FIG. 3(a) shows magnet 32 at a distance $d_1$ above a ferrous substrate 100 that is substantially parallel to the pole face of magnet 32. The magnetic flux density $\phi_1$ is represented by the number of magnetic field lines 31 passing through a plane segment A that has an area substantially the same as the area of the pole face of magnet 32. Plane segment A is located near the pole face of magnet 32, between the magnet 32 and the ferrous substrate 100, and is substantially parallel to both the pole face of the magnet 32 and the ferrous substrate 100.

Similarly, FIG. 3(b) shows magnet 32 at a distance $d_2$ above a ferrous substrate 100 that is substantially parallel to the pole face of magnet 32. The magnetic flux density $\phi_2$ is represented by the number of magnetic field lines 31 passing through the plane segment A that has an area substantially the same as the area of the pole face of magnet 32. Plane segment A is located near the pole face of magnet 32, between the magnet 32 and the ferrous substrate 100, and is substantially parallel to both the pole face of the magnet 32 and the ferrous substrate 100.

As magnet 32 gets closer to ferrous substrate 100, the number of magnetic field lines 31 emanating from the pole face of magnet 32 that enter the highly permeable ferromagnetic ferrous substrate 100 increases. Thus, the number of magnetic field lines 31 passing through plane segment A also increases as magnet 32 gets closer to ferrous substrate 100, and therefore the magnetic flux density $\phi$ increases as the distance d between magnet 32 and ferrous substrate 100 decreases. FIGS. 3(a) and (b) illustrate that $\phi_2 > \phi_1$ since $d_2 < d_1$. The magnetic flux density $\phi$ is reciprocally related to the distance d between magnet 32 and ferrous substrate 100. The correlation between the magnetic flux density $\phi$ measured and the distance d between magnet 32 and ferrous substrate 100 can be used to calibrate a gauge that determines the thickness of a nonferrous coating on a ferrous substrate 100.

The thermistor 40 output of temperature T of Hall effect sensor 50 is used by controller 90 to effect temperature compensation for the magnetic flux density $\phi$ output from Hall effect magnetic sensor 50 by using experimentally determined compensation factors for each combination of Hall effect magnetic sensor 50 and permanent magnet 30. The temperature-compensated magnetic flux density $\phi^{tempcomp}$ can be experimentally related to the distance $d^{coating}$ between the probe tip 70 and an underlying ferrous substrate. A mathematical relationship, preferably of the form $$\phi^{tempcomp} \propto \left(\frac{1}{d^{coating}}\right)^\nu$$

where $\nu$, is an adjustable exponent, can be determined to approximately fit the experimental points. Using the experimentally determined mathematical relationship, controller 90 gauges the coating thickness $d^{coating}$ of a nonferrous coating from measurements of the temperature-compensated magnetic flux density $\phi^{tempcomp}$.

Figures 4A, 4B:
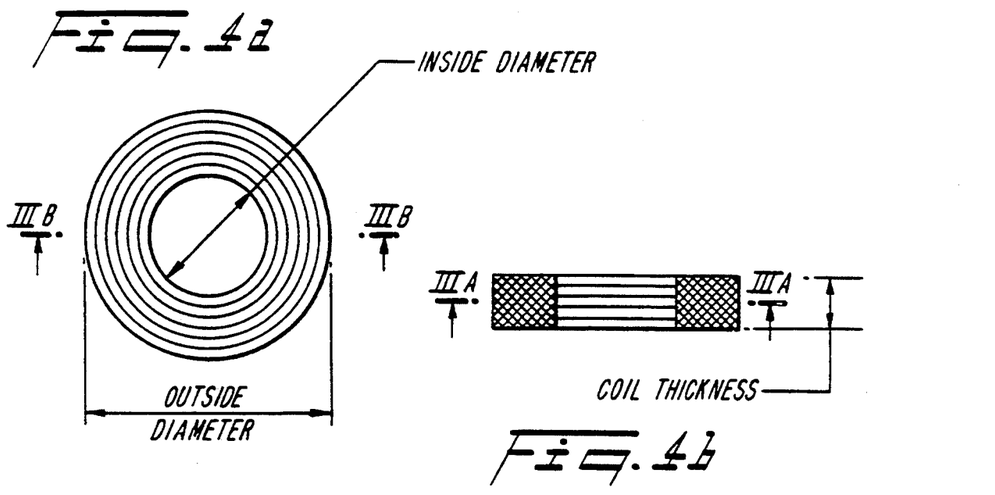
FIG. 4(a) is a cross section of an eddy current coil for use in an embodiment of the present invention taken along line IIIA—IIIA in FIG. 4(b)
FIG. 4(b) is a cross section of an eddy current coil for use in an embodiment of the present invention taken along line IIIB—IIIB in FIG. 4(a)

Eddy current search coil 60 is constructed as shown in FIGS. 4(a) and (b), and coil 60 is positioned parallel to the coating and substrate for better uniformity in the measurements across the area of coil 60 spanned by the inside diameter shown in FIG. 4(a). Preferably, coil 60 is made from about 60 turns of 39 AWG wire wound in a pancake configuration with an inside diameter of about 3 mm, an outside diameter of about 5.25 mm, a thickness of about 0.5 mm. Eddy current search coil 60 is wound around Hall effect magnetic sensor 50, as shown in FIGS. 1(a) and (b), thereby saving space, making for a compact probe core 10, and thus a compact gauge probe. A compact gauge probe offers the advantage of only requiring at most one relatively small area of contact with the coated substrate, the area of contact being determined by the area of probe tip 70 at the point of contact with the coated substrate. A small area of contact is particularly advantageous when gauging the coating thickness of a heated coated substrate. Furthermore, disposition of coil 60 as close as possible to probe tip 70, and hence as close as possible to the surface of the coated substrate, reduces the air gap between coil 60 and the eddy currents induced in the substrate thereby strengthening the magnetic coupling between coil 60 and the induced eddy currents and making for more accurate measurements of the mutual influences that coil 60 and the induced eddy currents have on each other.

Eddy current search coil 60 is excited by an alternating current oscillating with a frequency between about 6 MHz and about 12 MHz, setting up eddy currents on, or near, the surface of the conductive substrate 110. The eddy currents induced by the coil 60 in turn create an opposing magnetic field according to Lenz's law. Eddy current search coil 60 thus senses a net magnetic flux density $\phi^{net}$ that is the difference between the exciting magnetic flux density $\phi^{excite}$ and the eddy current magnetic flux density $\phi^{eddy}$ according to the equation $$\Psi^{net}(Z,t) = \Psi^{excite}(Z,t) - \Psi^{eddy}(Z,t)$$

which exhibits the explicit dependencies of the magnetic flux densities $\phi$ on time t and on the height z of coil 60 above the planar surface of the nonferrous conductive substrate that is normal to the symmetry axis of coil 60. The net magnetic flux density $\phi$ linking coil 60 affects the impedance $Z^{coil}$ of coil 60.

Figures 5A, 5B:
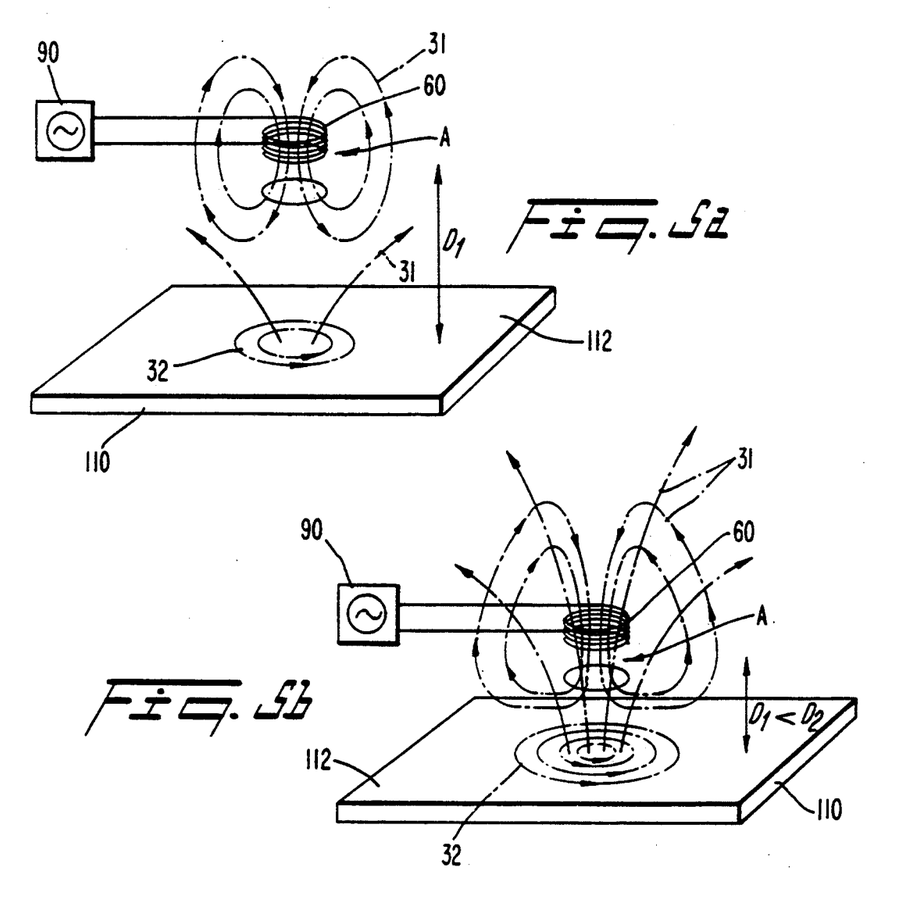
FIG. 5(a) is a diagrammatic representation of magnetic field lines of an electromagnetic coil that is a distance $D_1$ above a nonferrous conductive substrate.
FIG. 5(b) is a diagrammatic representation of magnetic field lines of an electromagnetic coil that is a distance $D_2$ above a nonferrous conductive substrate, where $D_2 < D_1$ in FIG. 5(a)

FIGS. 5(a) and (b) diagrammatically illustrate the instantaneous magnetic field lines 31 and the effect on net magnetic flux density $\phi^{net}$ linking coil 60 as coil 60 is brought near a nonferrous conductive material 110 whose surface 112 is substantially parallel to the area coil 60. The instant in time depicted in FIGS. 5(a) and (b) is the instant that the magnetic field induced by the coil achieves a maximal value pointing downward. FIG. 5(a) shows coil 60 at a distance $D_1$ above the surface 112 of a nonferrous conductive substrate 110 that is substantially parallel to the area of coil 60. The instantaneous magnetic flux density $\phi^{excite}$ at distance $D_1$ is represented by the number of downward pointing magnetic field lines 31 passing through coil 60. The instantaneous eddy current magnetic flux density $\phi^{eddy}$ at distance $D_1$ is represented by the number of upward pointing magnetic field lines 31 passing through coil 60, the instantaneous eddy currents 32 being shown on surface 112.

Similarly, FIG. 5(b) shows coil 60 at a distance $D_2$ above the surface 112 of a nonferrous conductive substrate 110 that is substantially parallel to the area of coil 60. The instantaneous magnetic flux density $\phi^{excite}$ at distance $D_2$ is represented by the number of downward pointing magnetic field lines 31 passing through coil 60. The instantaneous eddy current magnetic flux density $\phi^{eddy}$ at distance $D_2$ is represented by the number of upward pointing magnetic field lines 31 passing through coil 60, the instantaneous eddy currents 32 being shown on surface 112.

As coil 60 gets closer to nonferrous conductive substrate 110, the net number of magnetic field lines 31 linking coil 60 decreases. Thus, the number of magnetic field lines 31 passing through the area of coil 60 also decreases as coil 60 gets closer to nonferrous conductive substrate 110, and therefore the net magnetic flux density $\phi^{net}$ decreases as the distance D between coil 60 and nonferrous conductive substrate 110 decreases. FIGS. 5(a) and (b) illustrate that the net magnetic flux density $\phi^{net} = \phi^{excite} - \phi^{eddy}$ decreases since $D_2 < D_1$. The magnetic flux density $\phi^{net}$ is directly related to the distance D between coil 60 and nonferrous conductive substrate 110. The correlation between the magnetic flux density $\phi^{net}$ measured and the distance D between coil 60 and nonferrous conductive substrate 110 can be used to calibrate a gauge that determines the thickness of a nonconductive coating on a nonferrous conductive substrate 110.

Thus, as coil 60 is brought closer to the planar surface 112 of nonferrous conducting substrate 110 that is normal to the symmetry axis of coil 60, more of the eddy current magnetic flux density $\phi^{eddy}$ links coil 60 thereby decreasing the overall net magnetic flux density $\phi^{net}$ linking coil 60. Since the impedance $Z^{coil}$ of coil 60 is proportional to the net magnetic flux density $\phi^{net}$ linking coil 60, the impedance $Z^{coil}$ of coil 60 will therefore depend on the distance of coil 60 from the surface of the conductive substrate 110.

Controller 90 connected to coil 60 conventionally measures the impedance $Z^{coil}$ of coil 60. The measured impedance $Z^{coil}$ of coil 60 can be experimentally related to the distance $D^{coating}$ between the probe tip 70 and an underlying conductive substrate. A mathematical relationship, preferably of the form $$Z^{coil} \propto \psi^{net} \propto (D^{coating})^{\xi}$$

where $\xi$ is an adjustable exponent, can be determined to approximately fit the experimental points. Using the experimentally determined mathematical relationship, controller 90 gauges the coating thickness $D^{coil}$ of a nonconductive coating from measurements of the impedance $Z^{coil}$ of coil 60.

Figure 6:
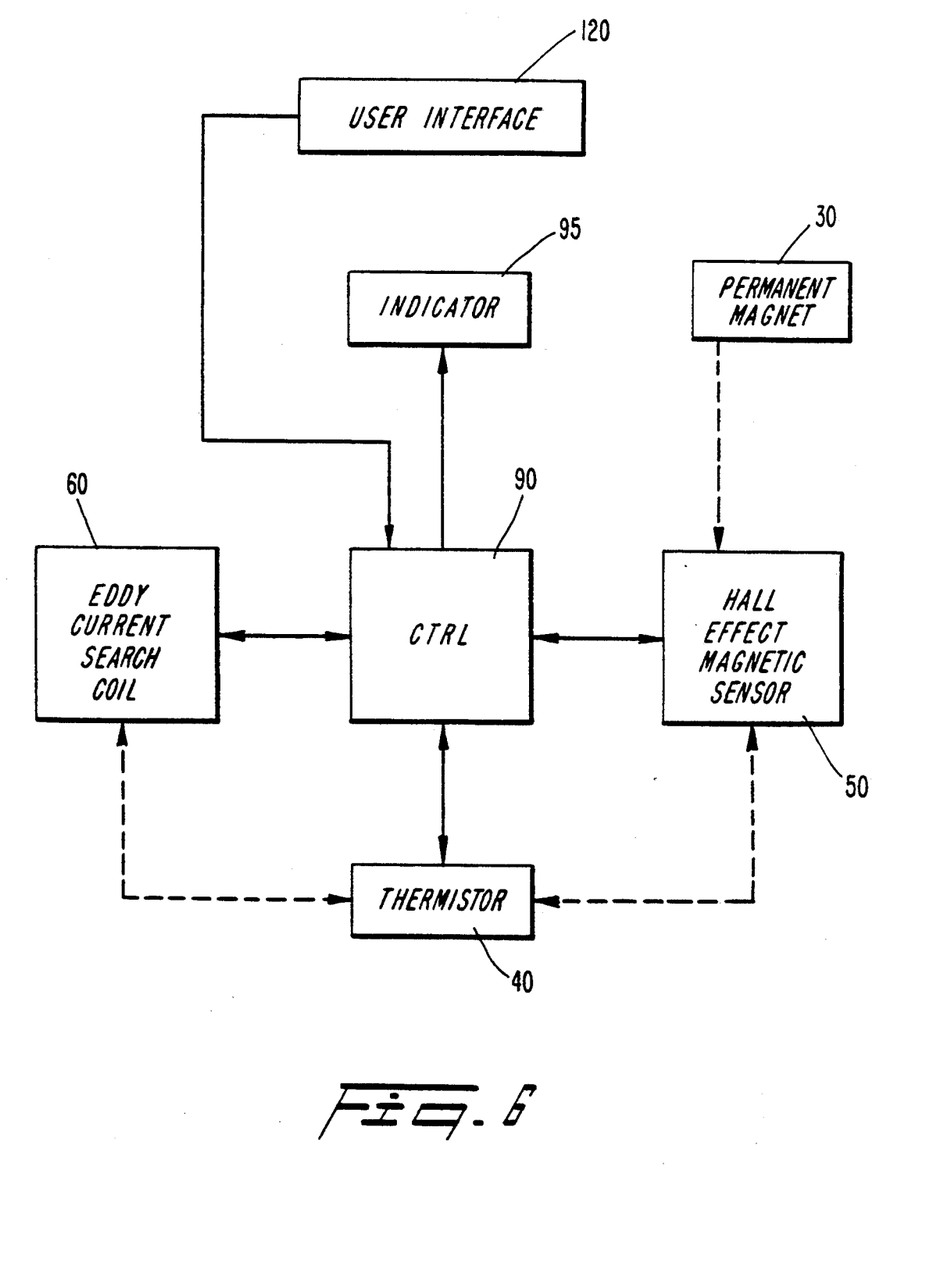
FIG. 6 is a diagrammatic representation of a controller for a gauge according to an embodiment of the present invention.

As shown in FIGS. 1(a) and (b), and in FIG. 6, controller 90 receives inputs from, and directs control commands to, Hall effect magnetic sensor 50, thermistor 40, and eddy current search coil 60. Controller 90 also outputs signals to indicator 95 to indicate the gauged coating thickness. Controller 90 receives input signals from user interface 120. Electrical connections in FIG. 6 are indicated by solid arrows. Thermal connections in FIG. 6 are indicated by dotted arrows. In a preferred embodiment according to the present invention, thermal connections between eddy current search coil 60, thermistor 40, Hall effect magnetic sensor 50, and permanent magnet 30 are provided by thermally conductive epoxy 80, as shown in FIG. 1(b).

In a preferred embodiment according to the present invention, controller 90 comprises a suitable conventional microprocessor equipped with the requisite Input/Output communication ports. Controller 90 limits the range of indication of $d^{coating}$ on a ferrous substrate to a predetermined arbitrary value $d^{max}$ such that for indications of $d^{coating}$ on a ferrous substrate above $d^{max}$ controller 90 automatically switches over and attempts to measure the coating thickness using conventional eddy current techniques that employ eddy current search coil 60. The predetermined arbitrary value $d^{max}$ is stored conventionally in a memory storage area of controller 90. For example, in a preferred embodiment of a gauge according to the present invention useful for gauging coating thicknesses of up to about 60 mils (about 1.524 ram), a preferred value of $d^{max}$ is about 80 mils (about 2.032 mm).

Physically, the effect of eddy currents induced in an underlying nonferrous conductive substrate on an external magnetic field in the vicinity of the substrate is the same whether the external magnetic field is produced by a permanent magnet, such as permanent magnet 30, or produced by an electromagnetic coil, such as coil 60. As shown in FIG. 5(b), Lenz's law dictates that the net effect of the magnetic field produced by the induced eddy currents 32 in the conductive substrate is to reduce the net number of magnetic field lines 31 passing through plane segment A, subtracting the number of upward pointing magnetic field lines passing through plane segment A from the number of downward pointing magnetic field lines passing through plane segment A. Therefore, the net magnetic flux density $\phi^{net}$ decreases as a result of the eddy currents induced in the conductive substrate. The reduction in the net magnetic flux density $\phi^{net}$ as a result of the eddy currents 32 induced in the conductive substrate becomes more pronounced the closer probe tip 70 gets to the underlying conductive substrate, and thus becomes more pronounced for thinner coatings. The decrease in the net magnetic flux density $\phi^{net}$, as a result of the eddy currents 32 induced in an underlying conductive substrate, as the distance d between probe tip 70 and the underlying substrate decreases is exactly opposite to the increase in the net magnetic flux density $\phi^{net}$ as the distance d between probe tip 70 and an underlying ferrous substrate decreases. Whenever the temperature-compensated magnetic flux density $\phi^{tempcomp}$ corresponds to a coating thickness $d^{coating}$ that exceeds the threshold predetermined value $d^{max}$, controller 90 automatically assumes that instead of there being an excessively thick nonferrous coating with thickness $d^{max}$ overlying a ferrous substrate there must be an underlying conductive substrate. Therefore, controller 90 automatically switches over to directly and accurately measure the induced eddy current effects and thereby determine the thickness $D^{coating}$ of the nonconductive coating overlying the nonferrous conductive substrate.

If an operator knows beforehand that only a measurement of a nonconductive coating on a conductive substrate is required, the operator can lock controller 90 using user interface 120 so that only coating thickness measurements using eddy current search coil 60 are made. If controller 90 is not locked by the operator, then controller 90 first determines the temperature-compensated magnetic flux density $\phi^{tempcomp}$ and tests to see whether $d^{coating}$ is greater than $d^{max}$ before measuring the induced eddy current effects.

Figure 7:
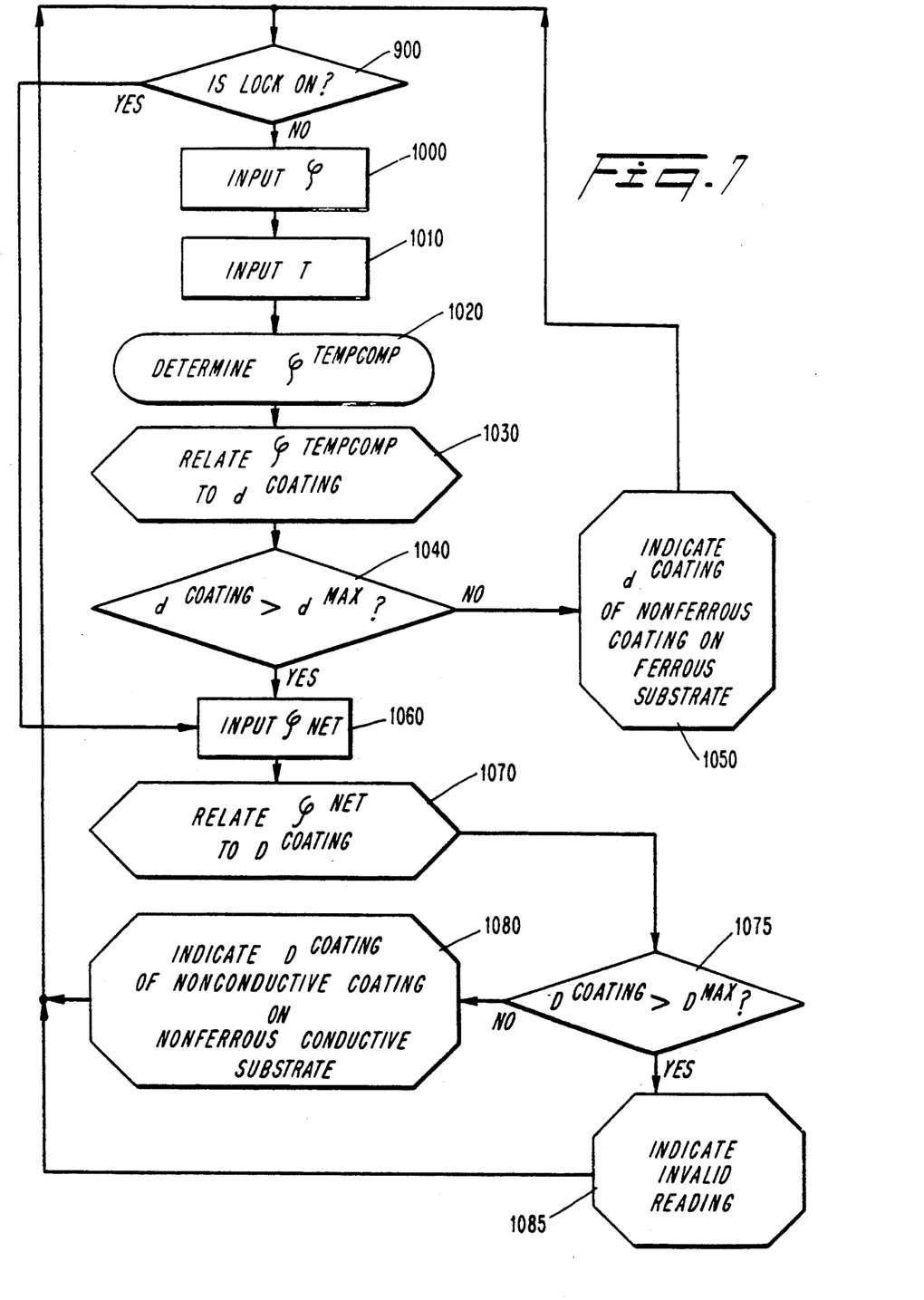
FIG. 7 illustrates a flow of operational steps taken by the controller shown in FIG. 6.

Operationally, FIG. 7 illustrates a flow of steps taken by controller 90. Controller 90 tests to see whether the lock has been set at step 900. If the lock is ON, controller 90 goes to step 1060. If the lock is OFF, controller 90 goes to step 1000. Controller 90 energizes the Hall effect magnetic sensor 50 and the magnetic flux density $\phi$ measured by Hall effect magnetic sensor 50 is input to controller 90 at step 1000. The temperature T measured by thermistor 40 is input to controller 90 at step 1010. Controller 90 uses the input magnetic flux density $\phi$ and temperature T to determine the temperature-compensated magnetic flux density $\phi^{tempcomp}$ at step 1020. Controller 90 relates temperature-compensated magnetic flux density $\phi^{tempcomp}$ to the distance $d^{coating}$ between probe tip 70 and an underlying ferrous substrate at step 1030. Preferably, controller 90 relates temperature-compensated magnetic flux density $\phi^{tempcomp}$ to distance $d^{coating}$ at step 1030 using the mathematical relationship $$\phi^{tempcomp} = k_{EXP} \left( \frac{1}{d^{coating}} \right)^{\nu_{EXP}}$$

where $k_{EXP}$ is an experimentally determined constant of proportionality, and where $\nu_{EXP}$ is an experimentally determined exponent.

Controller 90 tests to see whether the distance $d^{coating}$ calculated at step 1030 is greater than a predetermined maximum value $d^{max}$ at step 1040. If distance $d^{coating}$ is not greater than the predetermined maximum value $d^{max}$, then controller 90 signals indicator 95 at step 1050 to indicate distance $d^{coating}$ as the gauged thickness of a nonferrous coating on a ferrous substrate. Controller 90 then returns to step 900, where controller 90 tests to see whether the lock has been set.

If the test at step 1040 reveals that $d^{coating}$ is greater than the predetermined maximum value $d^{max}$, then controller 90 excites eddy current search coil 60 and inputs the net magnetic flux density $\phi^{net} = \phi^{excite} - \phi^{eddy}$ at step 1060. Controller 90 relates net magnetic flux density $\phi^{net}$ to the distance $D^{coating}$ between probe tip 70 and an underlying nonferrous conductive substrate at step 1070. Preferably, controller 90 relates net magnetic flux density $\phi^{net}$ to the distance $D^{coating}$ at step 1070 using the mathematical relationship $$\phi^{net} = K_{EXP} (D^{coating})^{\xi_{EXP}}$$

where $K_{EXP}$ is an experimentally determined constant of proportionality and where $\xi_{EXP}$ is an experimentally determined exponent.

Controller 90 tests to see whether the distance $D^{coating}$ calculated at step 1070 is greater than a predetermined maximum value $D^{max}$ at step 1075. If distance $D^{coating}$ is not greater than the predetermined maximum value $D^{max}$, then controller 90 signals indicator 95 at step 1080 to indicate distance $D^{coating}$ as the gauged thickness of a nonconductive coating on a nonferrous conductive substrate. Controller 90 then returns to step 900, where controller 90 tests to see whether the lock has been set.

If the test at step 1040 reveals that $D^{coating}$ is greater than the predetermined maximum value $D^{max}$, then controller 90 signals indicator 95 at step 1085 to indicate an invalid reading. Controller 90 then returns to step 900, where controller 90 tests to see whether the lock has been set.

An alternative embodiment of a gauge probe according to the present invention replaces the permanent magnet 30 with a cylindrical ferromagnetic core piece. In this alternative embodiment, coil 60 is wound around the end of the cylindrical ferromagnetic core piece closest to Hall effect magnetic sensor 50 rather than being wound around Hall effect magnetic sensor 50. When controller 90 excites coil 60 wound around the cylindrical ferromagnetic core piece with a zero frequency current, a direct current (D.C.), an electromagnet is formed that effectively takes the place of permanent magnet 30 in the foregoing preferred embodiment. In this alternative embodiment, controller 90 ensures that coil 60 is excited with D.C. at substantially the same time that Hall effect magnetic sensor 50 is energized while the gauge sensor is attempting to gauge the thickness of a nonferrous coating overlying a ferrous substrate.

The present invention has been described above in terms of specific embodiments. It will be readily appreciated by one of ordinary skill in the art, however, that the invention is not limited to these embodiments, and that, in fact, the principles of the invention may be embodied and practiced in devices and methods other than those specifically described above. For example, the foregoing references to a "ferrous substrate" should be understood to include more generally a "magnetic substrate", and the like, and references to a "nonferrous coating" should be understood to include more generally a "nonmagnetic coating", and the like. Therefore, the invention should not be regarded as being limited to these specific embodiments, but instead should be regarded as being fully commensurate in scope with the following claims. Furthermore, any element in the following claims expressed as a means or step for performing a specified function without the recital of structure, material, or acts in support thereof shall be construed to cover the corresponding structure, material, or acts described herein and equivalents thereof.

What is claimed is:

1. A coating thickness gauge for measuring both a nonferrous coating on a ferrous substrate and a nonconductive coating on a conductive nonferrous substrate, comprising:

a permanent magnet having a pole face;

a magnetic flux density sensor disposed near the pole face of said permanent magnet so as to sense a magnetic field in a neighborhood of said pole face;

an eddy current search coil disposed around the neighborhood of said pole face; and control means for receiving inputs from said magnetic flux density sensor and said eddy current search coil, selecting one of said inputs for calculating a coating thickness, and calculating a coating thickness based on the selected input.

2. The gauge of claim 1, wherein said magnet, sensor, and eddy current search coil are located in a single gauge probe.

3. The gauge of claim 2, further comprising:

a temperature sensor connected to said magnetic flux density sensor so as to sense temperature in a neighborhood of said magnetic flux density sensor.

4. A coating thickness gauge for measuring both a nonferrous coating on a ferrous substrate and a nonconductive coating on a conductive nonferrous substrate, comprising:
- a permanent magnet having a pole face;
- magnetic flux density sensor means disposed near the pole face of said permanent magnet for sensing a magnetic field in a neighborhood of said pole face;
- an eddy current search coil disposed around the neighborhood of said pole face;
- temperature sensor means connected to said magnetic flux density sensor means for sensing temperature in a neighborhood of said magnetic flux density sensor means, wherein said sensed temperature can be used to compensate a magnetic field measurement of said magnetic flux density sensor; and
- control means for receiving inputs from said magnetic flux density sensor means and said eddy current search coil, selecting one of said inputs for calculating a coating thickness, and calculating a coating thickness based on said selected input.

5. The gauge of claim 1, wherein the magnetic flux density sensor is a Hall effect magnetic sensor.

6. The gauge of claim 1, wherein the temperature sensor is a thermistor.

7. The gauge of claim 4, wherein the magnetic flux density sensor means is a Hail effect magnetic sensor.

8. The gauge of claim 4, wherein the temperature sensor means is a thermistor.

9. A gauge probe for a combination coating thickness gauge that allows the combination coating thickness gauge to measure both a nonferrous coating on a ferrous substrate and a nonconductive coating on a conductive nonferrous substrate, the gauge probe enabling the combination coating thickness gauge to determine automatically, with a single probe, substrate characteristics, and to effect a measurement of coating thickness on said characterized substrate, the gauge probe comprising:
- a permanent magnet having a pole face;
- a Hall effect magnetic sensor disposed near the pole face of said permanent magnet so as to sense a magnetic field in a neighborhood of said pole face;
- an eddy current search coil disposed around the neighborhood of said pole face;
- a thermistor connected to said Hall effect magnetic sensor so as to sense temperature in a neighborhood of said Hall effect magnetic sensor, wherein said sensed temperature can be used to compensate a magnetic flux density measurement; and
- control means for receiving inputs from said Hall effect magnetic sensor, said eddy current search coil and said thermistor and for determining the substrate characteristics and the coating thickness based on one or more of said inputs.

10. A gauge probe for a combination coating thickness gauge that allows the combination coating thickness gauge to measure both a nonferrous coating on a ferrous substrate and a nonconductive coating on a conductive nonferrous substrate, the gauge probe enabling the combination coating thickness gauge to determine automatically, with a single probe, substrate characteristics, and to effect a measurement of coating thickness on said characterized substrate, the gauge probe comprising:
- a permanent magnet having a pole face;
- Hall effect magnetic sensor means disposed near the pole face of said permanent magnet for sensing a magnetic field in a neighborhood of said pole face;
- an eddy current search coil disposed around the neighborhood of said pole face;
- thermistor means connected to said Hall effect magnetic sensor means for sensing temperature in a neighborhood of said Hall effect magnetic sensor means, wherein said sensed temperature can be used to compensate a magnetic flux density measurement; and
- control means for receiving inputs from said Hall effect magnetic sensor, said eddy current search coil and said thermistor and for determining the substrate characteristics and the coating thickness based on one or more of said inputs.

11. A method for gauging thickness of both a nonferrous coating on a ferrous substrate and a nonconductive coating on a conductive nonferrous substrate, using a coating thickness gauge, the gauge probe enabling the combination coating thickness gauge to determine automatically, with a single probe, substrate characteristics, and to effect a measurement of coating thickness on said characterized substrate, the method comprising the steps of:
- placing the probe on a coating that is on a substrate;
- determining if the substrate is ferrous by measuring a magnetic flux density at a pole of a permanent magnet disposed in said gauge probe;
- if it is determined that the substrate is ferrous, using said magnetic flux density to determine the coating thickness;
- if it is determined that the substrate is not ferrous, then measuring effects of eddy currents generated in the substrate to determine the coating thickness.

12. The method of claim 11, further comprising the steps of:
- effecting temperature compensation of the magnetic flux density using a temperature sensor.

13. The gauge of claim 1, wherein the eddy current search coil comprises about 60 turns of 39 AWG wire wound in a pancake configuration with an inside diameter of about 3 mm, an outside diameter of about 5.25 mm, a thickness of about 0.5 mm.

14. The gauge of claim 1, wherein the eddy current search coil is excited by an alternating current oscillating with a frequency between about 6 MHz and about 12 MHz.

15. A gauge probe for a combination coating thickness gauge that allows the combination coating thickness gauge to measure both a nonferrous coating on a ferrous substrate and a nonconductive coating on a conductive nonferrous substrate, the gauge probe enabling the combination coating thickness gauge to determine automatically, with a single probe, substrate characteristics, and to effect a measurement of coating thickness on said characterized substrate, the gauge probe comprising:
- a controller;
- a permanent magnet connected to said controller;
- a Hall effect magnetic sensor connected to said controller, wherein said Hall effect magnetic sensor is disposed near a pole face of said permanent magnet so as to sense a magnetic field in a neighborhood of said pole face;
- an eddy current search coil connected to said controller, wherein said eddy current search coil is disposed around the neighborhood of said pole face; and a thermistor connected to said controller, wherein said thermistor is connected to said Hall effect magnetic sensor so as to sense temperature in a neighborhood of said Hall effect magnetic sensor, wherein said sensed temperature can be used to compensate a magnetic flux density measurement.

16. A gauge probe for a combination coating thickness gauge that allows the combination coating thickness gauge to measure both a nonferrous coating on a ferrous substrate and a nonconductive coating on a conductive nonferrous substrate, the gauge probe enabling the combination coating thickness gauge to determine automatically, with a single probe, substrate characteristics, and to effect a measurement of coating thickness on said characterized substrate, the gauge probe comprising:

controller means;

a permanent magnet connected to said controller;

Hall effect magnetic sensor means connected to said controller means, wherein said Hall effect magnetic sensor means is disposed near a pole face of said permanent magnet for sensing a magnetic field in a neighborhood of said pole face;

an eddy current search coil connected to said controller means, wherein said eddy current search coil is disposed around the neighborhood of said pole face; and thermistor means connected to said controller means, wherein said thermistor means is connected to said Hall effect magnetic sensor means for sensing temperature in a neighborhood of said Hall effect magnetic sensor means, wherein said sensed temperature can be used to compensate a magnetic flux density measurement.

17. The gauge probe for a combination coating thickness gauge of claim 15, the gauge probe further comprising:

an indicator connected to said controller, wherein said indicator indicates said measurement of coating thickness on said characterized substrate.

18. The gauge probe for a combination coating thickness gauge of claim 16, the gauge probe further comprising:

indicator means connected to said controller means, wherein said indicator means indicates said measurement of coating thickness on said characterized substrate.

19. The gauge probe for a combination coating thickness gauge of claim 15, the gauge probe further comprising:

a user interface connected to said controller, wherein said user interface facilitates an interface between an operator and said controller.

20. The gauge probe for a combination coating thickness gauge of claim 16, the gauge probe further comprising:

user interface means connected to said controller means, wherein said user interface means facilitates an interface between an operator and said controller means.

* * * * *